US006480595B1

(12) United States Patent
Hamano

(10) Patent No.: US 6,480,595 B1
(45) Date of Patent: Nov. 12, 2002

(54) METHOD OF COMMUNICATION THROUGH LEASED LINE IN VIRTUAL PRIVATE NETWORK

(75) Inventor: Masaki Hamano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/238,745

(22) Filed: Jan. 28, 1999

(30) Foreign Application Priority Data

Jan. 30, 1998 (JP) .......................................... 10-032308

(51) Int. Cl.[7] ................................................ H04M 7/00
(52) U.S. Cl. .................. 379/225; 379/221.08; 379/230; 379/901; 379/221.15; 379/219
(58) Field of Search ........................... 379/219, 221.08, 379/221.09, 221.12, 221.15, 229, 112.09, 225, 230, 901

(56) References Cited

U.S. PATENT DOCUMENTS

| 4,348,554 A | * | 9/1982 | Asmuth .................. 379/112.09 |
| 5,339,356 A | * | 8/1994 | Ishii ............................ 379/234 |
| 5,455,855 A | * | 10/1995 | Hokari ........................ 379/229 |
| 5,490,212 A | * | 2/1996 | Lautenschlager ........... 379/225 |
| 5,539,817 A | * | 7/1996 | Wilkes ........................ 379/230 |
| 5,825,868 A | * | 10/1998 | Diamond .................... 379/243 |
| 5,917,899 A | * | 6/1999 | Moss et al. ............. 379/221.08 |
| 6,055,575 A | * | 4/2000 | Paulsen et al. ............. 709/229 |
| 6,141,409 A | * | 10/2000 | Madoch et al. ........ 379/207.02 |
| 6,175,622 B1 | * | 1/2001 | Chiniwala et al. ...... 379/221.09 |
| 6,285,879 B1 | * | 9/2001 | Lechner et al. ............. 455/432 |
| 6,377,677 B1 | * | 4/2002 | Ackerly et al. ............. 379/279 |

FOREIGN PATENT DOCUMENTS

| JP | 4-291595 | 10/1992 |
| JP | 6-205137 | 7/1994 |
| JP | 7-183945 | 7/1995 |
| JP | 7-221838 | 8/1995 |
| JP | 8-149229 | 6/1996 |
| JP | 8-195814 | 7/1996 |

* cited by examiner

Primary Examiner—Ahmad F. Matar
Assistant Examiner—Bing Bui
(74) Attorney, Agent, or Firm—Sughrue Mion, PLLC

(57) ABSTRACT

When a leased line is incorporated in a virtual private network forming a composite communication network together with a public network, a service control point searches a data base to see what private branch exchanger is the closest to a caller, and establishes a communication path including the leased line in the composite communication network so that high quality economical communication is offered between the subscribers.

13 Claims, 7 Drawing Sheets

METHOD OF COMMUNICATION THROUGH LEASED LINE IN VIRTUAL PRIVATE NETWORK

FIELD OF THE INVENTION

This invention relates to a communication method and, more particularly, to a method for communicating through a leased line in a virtual private network and a leased line.

DESCRIPTION OF THE RELATED ART

VPN (Virtual Private Network) and IN (Intelligent Networks) are kinds of private communication service through a public network. Specified subscribers communicate with one another through the virtual private network or the intelligent networks. Exchangers are incorporated in those networks, and steer pieces of data between the specified subscribers. When a terminal calls another terminal, the exchangers establish a communication path in the virtual private network or the intelligent networks, and pieces of data are transferred through the communication path between the terminals. In the following description, both VPN and IN are simply referred to as "virtual private network".

On the other hand, a leased line is exclusively used by a specific user, and an exchanger of the public network does not participate the communication between terminals of the specific user. The leased line achieves a high quality communication rather than the circuit switching service, and the communication through the leased line is more economical rather than the communication through the public network.

If the specified subscribers of the virtual private network have the leased line, the public network and the leased lines are theoretically available for the communication. In the following description, if a leased line is provided in parallel to a part of a virtual private network, the communication system is referred to as "composite communication network". The present inventor searched documents already published for the composite communication network. The present inventor found Japanese Patent Publication of Unexamined Application Nos. 4-291595, 6-205137, 7-183945, 7-221838 and 8-195814. The present inventor checked the Japanese Patent Publication of Unexamined Applications to see how the leased line is used in the composite communication network. However, the leased line is not effectively used.

FIG. 1 illustrates a prior art composite communication network. The virtual private network is owned by a user group 1, and a code (ggggg) is assigned to the user group 1. Subscribers 1a/1b/1c belong to the user group 1. The user group has a head office H1 in a city X and a branch office B1 in another city Y, and private branch exchangers 2a/2b are placed in the head office H1 and the branch office B1, respectively. The subscribers 1b and 1c are in the head office H1 and the branch office B1, and are connected to the private branch exchangers 2a/2b, respectively. The subscriber 1a is in yet another city Z. The communication between the head office H1 and the branch office B1 is so much that a leased line 3 is connected between the private branch exchangers 2a and 2b.

The virtual private network is established in a public network 4, and the public network 4 has exchangers 4a/4b/4c. The cities X/ Y/ Z are in the service areas of the exchangers 4a/4b/4c, respectively. The exchanger 4c serves as a service switching point, and is under the control of a service control point SCP.

When the subscriber 1a wants to communicate with the subscriber 1c through the virtual private network, the subscriber 1a requests the exchanger 4c to establish a communication path to the subscriber 1c in the virtual private network. The exchanger or the service switching point requests the service control point SCP to route the communication path from the subscriber 1a to the subscriber 1c. The service control point SCP takes the service area of the exchanger 4b into account, and routes the communication path 5 as "Exchanger 4c"—"Exchanger 4a"—"Exchanger 4b"—"PBX 2b"—"Subscriber 1c". Even though the leased line 3 is connected between the private branch exchangers 2a and 2b, the leased line 3 is not used for the communication between the subscribers 1a and 1c.

As described hereinbefore, the leased line provides a high quality communication, and is more economical rather than the public network. Therefore, the communication through the leased line 3 is desirable. However, the leased line 3 is not always used for the communication.

SUMMARY OF THE INVENTION

It is therefore an important object of the present invention to provide a method for a composite communication network which is a higher in quality and more economical than a virtual private network.

In accordance with one aspect of the present invention, there is provided a method for routing a communication path between a first subscriber and a second subscriber through a public network having service switching points and a service control point and a private network containing entry points and a leased line selectively connected between the entry points, and the method comprises the steps of transferring a first identification number and a second identification number respectively assigned to the first subscriber and second subscriber through at least one of the service switching points to the service control point, determining one of the entry points closest to the first subscriber and a routing number used in the private network, notifying the routing number to the one of the entry points through the public network for routing a communication sub-path passing through the leased line in the private network and establishing the communication path having the communication sub-path between the first subscriber and the second subscriber.

BRIEF DESCRIPTION OF THE DRAWINGS

The features and advantages of the method will be more clearly understood from the following description taken in conjunction with the accompanying drawings in which.

DESCRIPTION OF THE PREFERRED EMBODIMENTS

First Embodiment

Figure 1:
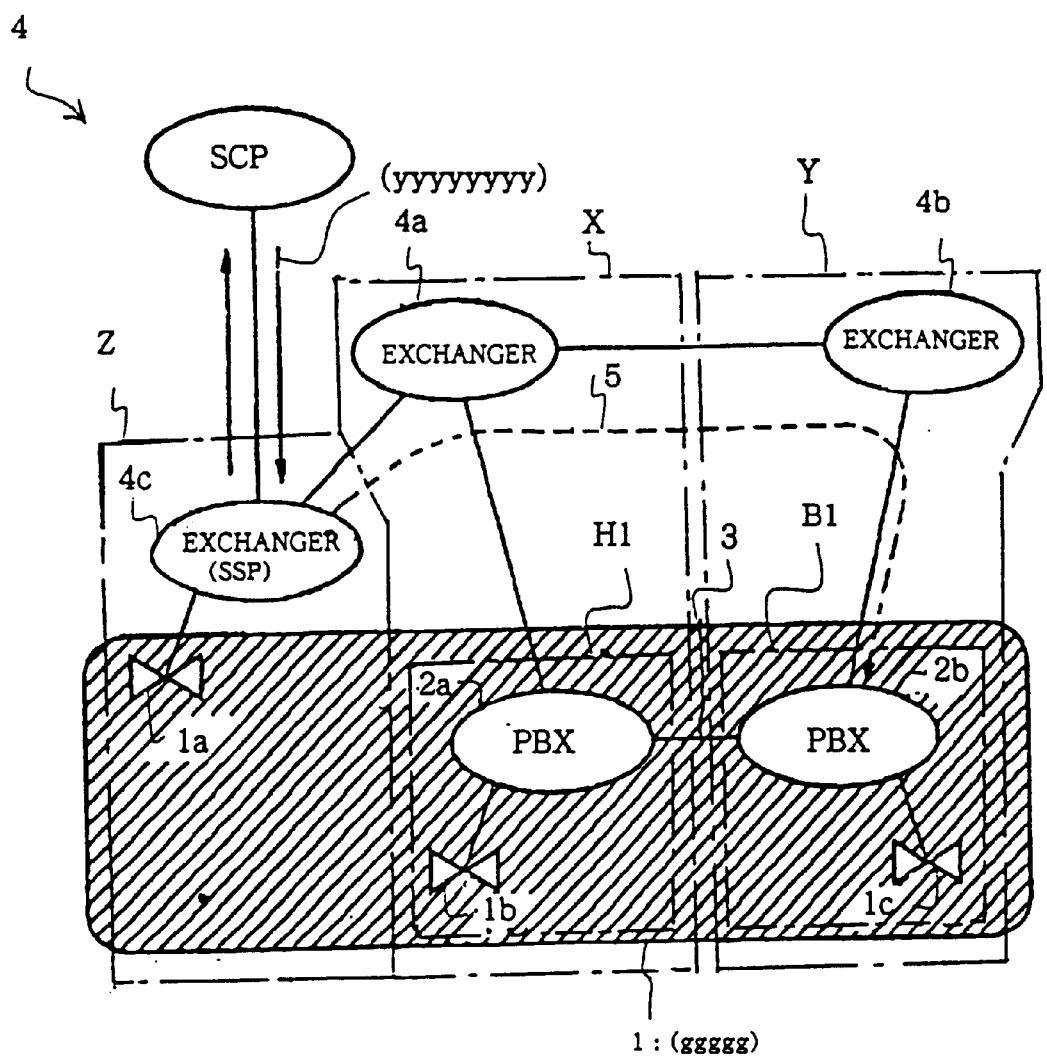
FIG. 1 is a schematic view showing the communication path established in the prior art composite communication network.
Figure 2:
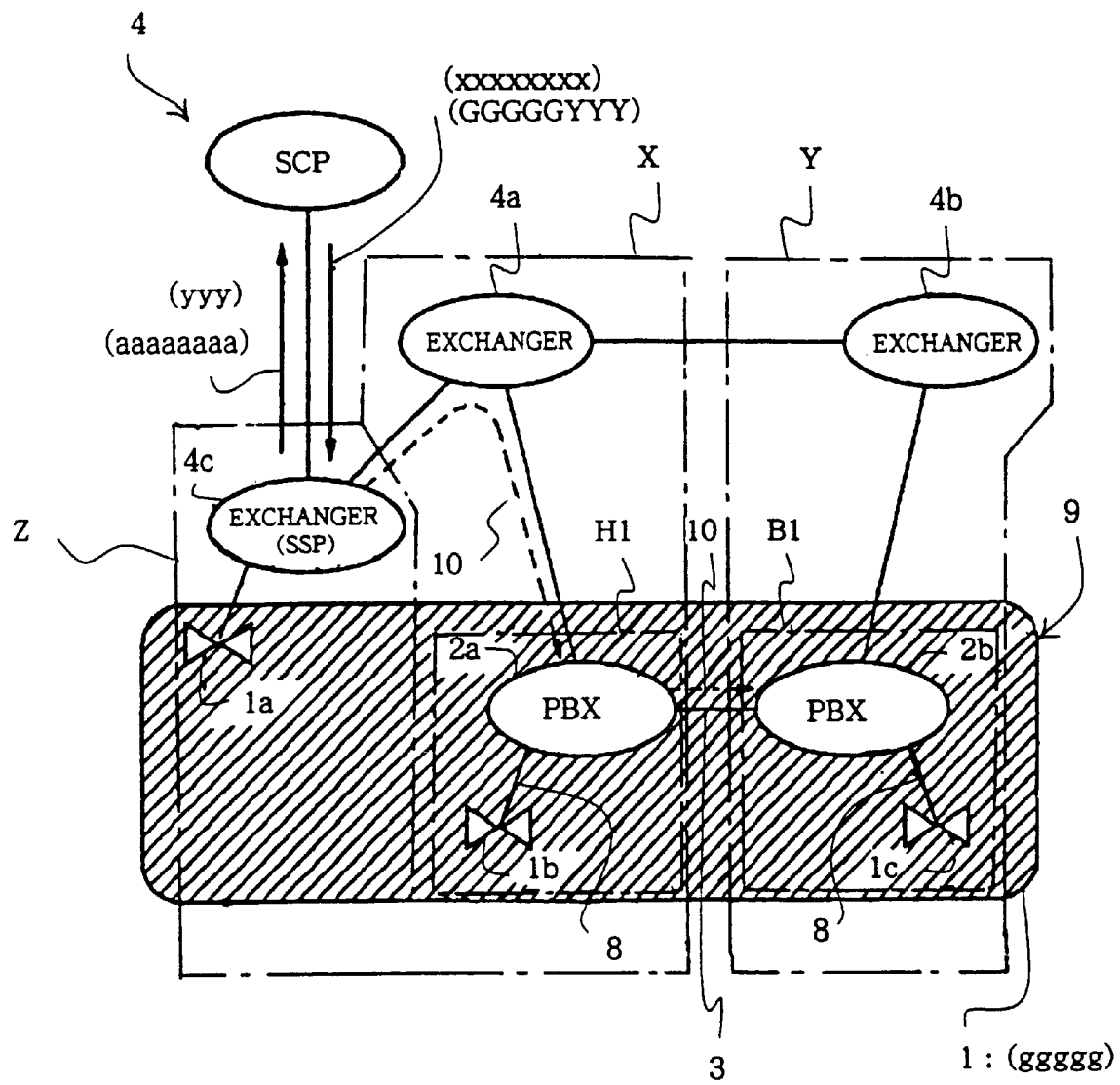
FIG. 2 is a schematic view showing a communication path established in a composite communication network through a method according to the present invention.

FIG. 2 illustrates a communication path established in a composite communication network through a method embodying the present invention. The composite communication network is similar to that shown in FIG. 1, and corresponding exchangers and corresponding lines are labeled with the same references as those of the prior art composite communication network. The private branch exchangers 2a/2b, house cables 8 and the leased line 10 form in combination a private network 9. The public network 4 and the private network 9 as a whole constitute a composite communication network.

An extension number (YYY) is assigned to an extension of the subscriber 1c, and the subscribers 1a/1c have a telephone number "aaaaaaaa" and another telephone number "yyyyyyyy". The exchangers 4c/4a/4b are respectively assigned area's identification numbers "A", "B" and "C", and the private branch exchangers 2a/2b are assigned area's identification numbers "X" and "Y", respectively. The area's identification number "X" is represented by a telephone number "xxxxxxxx". The cities X/Y/Z are in the service areas of the exchangers 4a/4b/ 4c, respectively, and term "service area" means "nearest area from the aspect of routing".

When the subscriber 1a wants to communicate with the subscriber 1c, a communication path 10 is established between the subscribers 1a and 1c in the composite communication network under the control of the service control point SCP, and the leased line 3 forms a part of the communication path 10.

Figure 3:
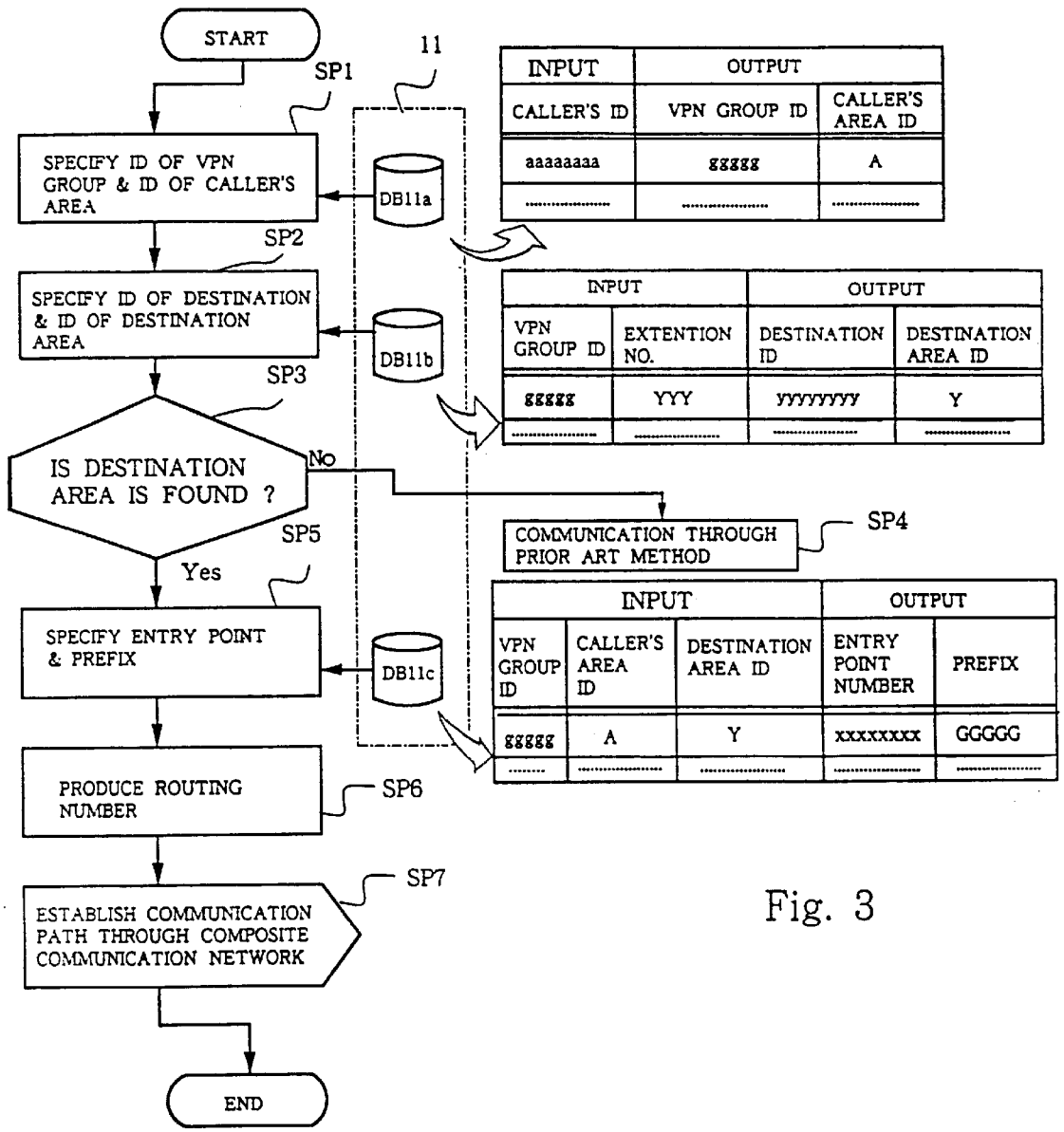
FIG. 3 is a flow chart showing the method according to the present invention.

FIG. 3 illustrates a control sequence for establishing the communication path 10 in the composite communication network. A data base 11 is stored in the service control point SCP, and contains at least three tables DB11a, DB11b and DB11c.

The first table DB11a defines relation between a caller's identification number, an identification number for a virtual private network group and a caller's area identification number. The caller's identification number is equal to the telephone number assigned to a subscriber 1a/1b/1c. When a caller's identification number is given, the first table DB11a specifies the identification number of the virtual private network and the identification number of the caller's area. The identification number of the caller's area is indicative of the exchanger of the public network 4 to which the caller is connected. The second table DB11b defines relation between the identification number of a virtual private network, an extension number, an identification number of a destination and an identification number of a destination area. The identification number of the destination is indicative of the telephone number of a subscriber to be connected to the caller, and the identification number of the destination area is indicative of the private branch exchanger 2a/2b to which the destination is connected. When the identification number of a virtual private network and the extension number are given, the second table DB11b specifies the identification number of the destination and the identification number of a destination area from the identification number of the virtual private network and the extension number. The first table DB11a gives the identification number of the virtual private network group to the service control point SCP, and the extension number is provided from the caller to the service control point SCP.

The third table DB11c defines relation between the identification number of a virtual private network group, the identification number of the caller's area, the identification number of the destination area, an entry point number and a prefix. The entry point number is representative of the telephone number assigned to an appropriate private branch exchanger 2a/2b for entering into the leased line 3. The prefix is combined with the extension number in order to determine a routing number for the private branch exchangers 2a/2b. When the identification number of the virtual private network group, the identification number of the caller's area and the identification number of the destination area are given, the third table DB11c specifies the entry point number and the prefix. The first table DB11a gives the identification number of the virtual private network group and the identification number of the caller's area to the service control point SCP, and the second table DB11b gives the identification number of the destination area to the service control point SCP.

Assuming now that the subscriber 1a dials the extension number (YYY), the extension number (YYY) is supplied from the subscriber 1a to the exchanger 4c. As described hereinbefore, the exchanger 4c serves as a service switching point SSP, and transfers the extension code (YYY) and the caller identification number (aaaaaaaa) to the service control point SCP.

When the extension number (YYY) and the caller identification number (aaaaaaaa) arrive at the service control point SCP, the service control point SCP starts the control sequence shown in FIG. 3. The service control point SCP firstly searches the first table DB11a for the caller's identification number "aaaaaaaa", and acquires a piece of data information representative of the identification number "A" of the caller's area and another piece of data information representative of the identification number "ggggg" of the virtual private network group to which the subscriber 1a belongs as by step SP1. The service control point SCP stores the pieces of data information in an internal memory (not shown).

Subsequently, the service control point SCP searches the second table DB11b for the combination of the identification numbers "ggggg" and the extension number "YYY", and acquires a piece of data information representative of the identification number "yyyyyyyy" of the destination and another piece of data information representative of the identification number "Y" of the destination as by step SP2. The service control point SCP stores the pieces of data information in the internal memory.

Subsequently, the service control point SCP checks to see whether or not an identification number of destination is found at step SP2 as by step SP3. If the answer at step SP3 is given negative, the service control point SCP establish a communication path between the subscribers in the virtual private network through the prior art communication method as by step SP4.

On the other hand, when the identification number of the destination was found at step SP2, the answer at step SP3 is given affirmative. With the affirmative answer, the service control point SCP searches the third table DB11c for the combination of the identification numbers "ggggg", "A" and "Y", and acquires a piece of the data information representative of the entry point number "xxxxxxxx" and another piece of data information representative of the prefix "GGGGG" as by step SP5. As described hereinbefore, the entry point number "xxxxxxxx" is indicative of the private branch exchanger 2a closest to the exchanger 4c.

Subsequently, the service control point SCP combines the extension number "YYY" with the prefix "GGGGG", and produces a routing number "GGGGGYYY" used in private network 9 as by step 5P6. The entry point number "xxxxx" and the routing number "GGGGGYYY" are stored in the internal memory.

Subsequently, the service control point SCP notifies the entry point number "xxxxxxxx" and the routing number "GGGGGYYY" to the service switching point SSP or the exchanger 4c, and the exchanger 4c routes the communication path 10 through the private network 9 as by step SP7. Namely, the exchanger 4c connects the subscriber 1a through the exchanger 4a to the private branch exchanger 2a, and supplies the routing number "GGGGGYYY" to the private branch exchanger 2a. The private branch exchanger 2a routes the communication path 10 through the leased line 3 to the private branch exchanger 2b, and the private branch exchanger 2b specifies the extension "YYY". Thus, the subscriber 1a is connected through the communication path 10 to the subscriber 1c.

In the above description, the subscribers 1a and 1c belong to the virtual private network group (ggggg). Even if either subscriber 1a/1c is out of the virtual private network (ggggg), a communication path is also established through the leased line 3.

As will be understood from the foregoing description, the method according to the present invention selects the private branch exchanger closest to the caller on the basis of the combination of the caller's area and the destination area. For this reason, the leased line 3 surely forms a part of the communication path 10, and the communication path achieves high quality communication at low cost.

Second Embodiment

Figure 4:
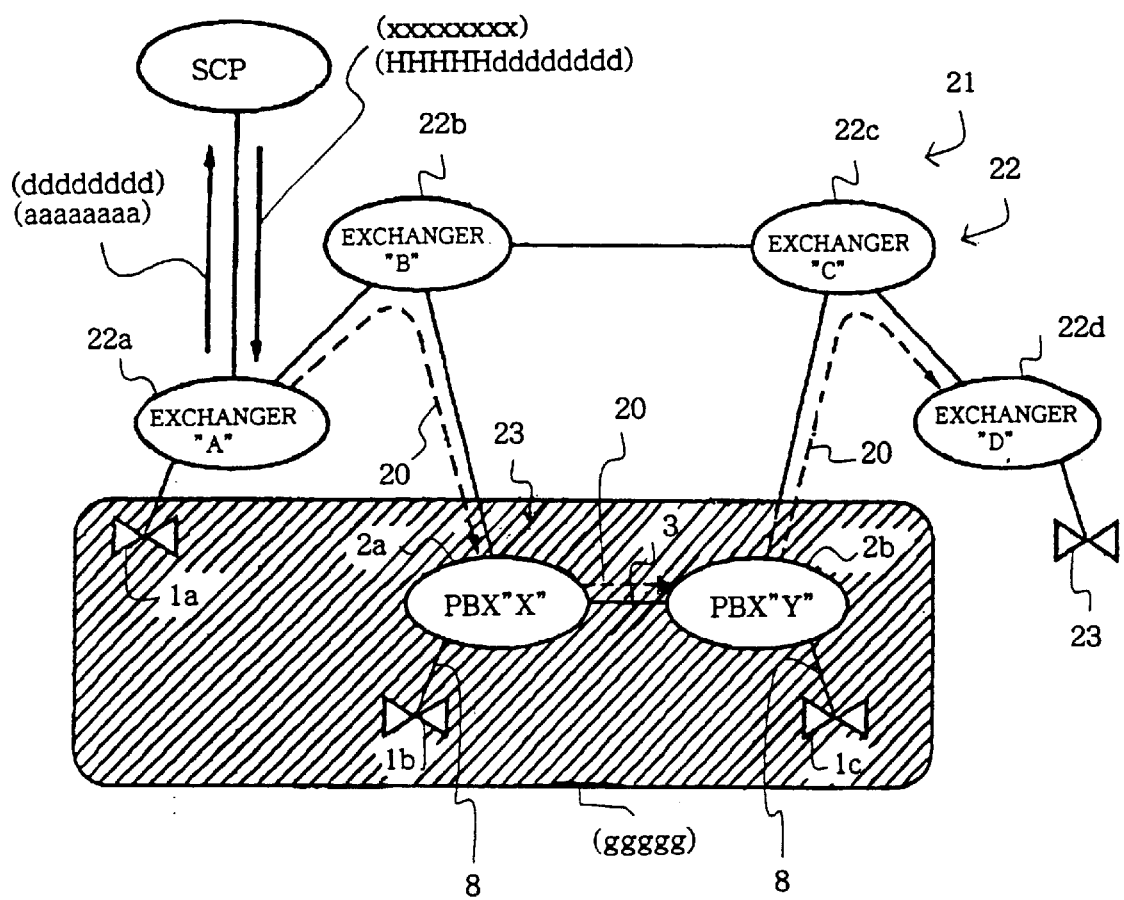
FIG. 4 is a schematic view showing another communication path established in a composite communication network through a method according to the present invention.

FIG. 4 illustrates another communication path 20 established in a composite communication network 21. The composite communication network 21 includes a public network 22 and a private network 23. The private network 23 is similar to the private network 9, and references used for the first embodiment designate corresponding private branch exchangers, corresponding subscribers, corresponding house cables and corresponding leased line without detailed description.

The public network 22 includes exchangers 22a/22b/22c/22d, a service control point SCP and at least one subscriber 23. A telephone number "dddddddd" is assigned to the subscriber 23. Each of the exchangers 22a/22b/22c/22d serves as a service switching point, and is communicable with the service control point SCP. Identification numbers "A", "B", "C" and "D" are respectively assigned to the exchangers 22a, 22b, 22c and 22d, and the private branch exchangers 2a/2b also have identification numbers "X", and "Y", respectively.

Figure 5:
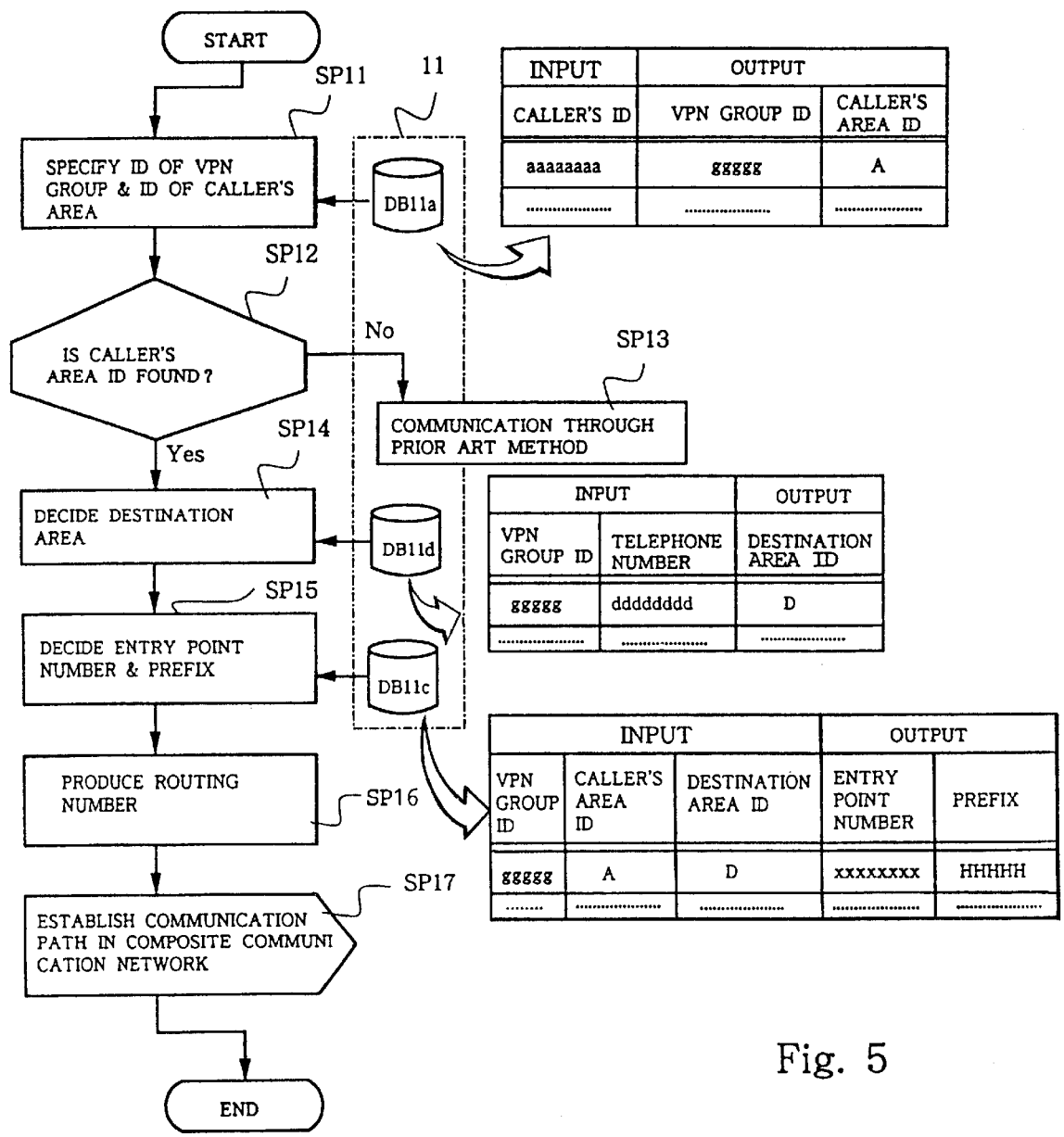
FIG. 5 is a flow chart showing the method according to the present invention.

FIG. 5 illustrates another control sequence embodying the present invention. The data base 11 has a fourth table DB11d instead of the second table DB11b, and the service control point SCP executes a job called as "Off Net Zone".

Assuming now that the subscriber 1a dials the telephone number "dddddddd", the communication path 20 is established in the composite communication network 21, and the leased line 3 forms a part of the communication path 20 as follows. The exchanger 22a supplies the telephone number of the subscriber 1a or the identification number of the caller "aaaaaaaa" and the telephone number "dddddddd" of the destination 23 to the service control point SCP.

The service control point SCP starts the control sequence shown in FIG. 5. The service control point SCP searches the first table DB11a for the identification. number "aaaaaaaa" of the subscriber 1a, and specifies the identification number "ggggg" of the virtual private network and the identification number of callers area "A" as by step SP11.

Subsequently, the service control point SCP checks to see whether or not an identification number of caller's area is found at step SP11 as by step SP12. If the answer at step SP12 is given negative, the service control point SCP determines the communication through the prior art method, and a communication path is established in the public network 22 as by step SP13

On the other hand, when the identification number of caller's area was found at step SP11, the answer at step 5P12 is given affirmative, and the service control point SCP starts the job called as "Off Net Zone", because the telephone number "dddddddd" is not registered in the first table DB11a. In detail, the service control point SCP searches the fourth table DB11d for the combination of the identification number "ggggg" and the telephone number "dddddddd", and decides the destination area to be "D" as by step SP14.

Subsequently, the service control point SCP searches the third table DB11c for the combination of the identification number "ggggg", the area identification numbers "A" and "D", and decides the entry point number and the prefix to be "xxxxxxxx" and "HHHHH" as by step SP15.

Subsequently, the service control point SCP produces a routing number "HHHHHdddddddd" for the private network 23 as by step SP16, and supplies the entry point number "xxxxxxxx" and the routing number to the service switching point 22c. The routing number "HHHHdddddddd" is maintained in the private network 23. The subscriber 1a is connected through the exchangers 22a and 22b to the private branch exchanger 2a, and the private branch exchanger 2a further connects it through the leased line 3 to the private branch exchanger 2b. The private branch exchanger 2b is connected through the exchangers 22c/22d to the subscriber 23. Thus, the subscriber 1a is connected through the communication path 20 to the subscriber 23, and the leased line 3 is effectively used in the communication.

Third Embodiment

Figure 6:
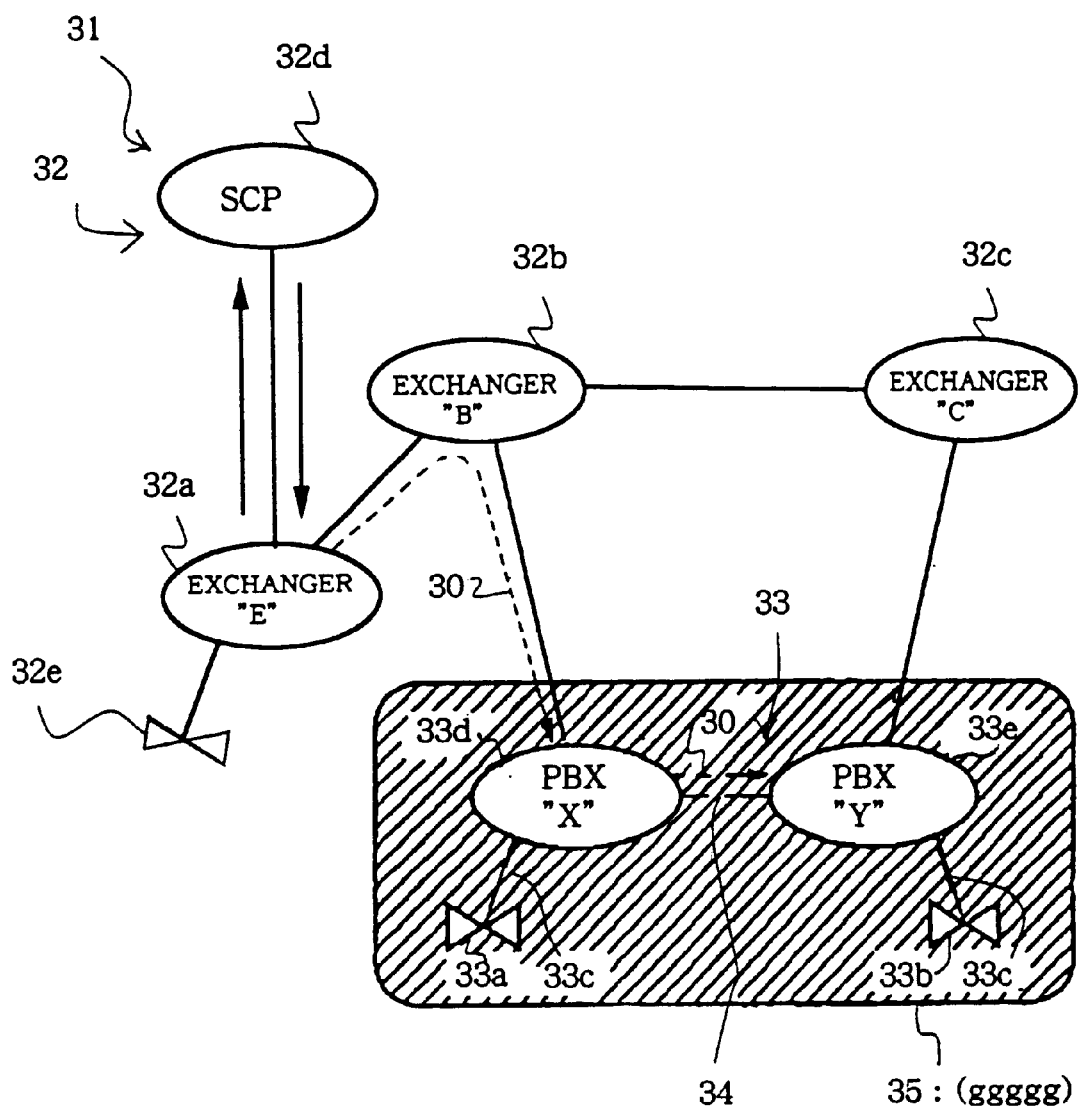
FIG. 6 is a schematic view showing a communication path established in a composite communication network through a method according to the present invention.

FIG. 6 illustrates a communication path 30 established in a composite communication network 31. The composite communication network 31 includes a public network 32 and a private network 33. Exchangers 32a/32b/32c, a service control point 32d and a subscriber 32e are incorporated in the public network 32, and the exchanger 32a serves as a service switching point SSP for the subscriber 32e. A telephone number "eeeeeeee" is assigned to the subscriber 32e.

The subscribers 33a/33b are connected through house cables 33c to private branch exchangers 33d/33e, and a leased line 34 is connected between the private branch exchangers 33d and 33e. Hatching lines are indicative of a virtual private network 35, and identification number (ggggg) is assigned to the virtual private network 35. The subscriber 32a is not incorporated in the virtual private network 35. A subscriber, who is not incorporated in the virtual private network 35, has to dial an access code "JJJJJ" in order to communicate a subscriber incorporated in the virtual private network 35. An extension number "YYY" is assigned to the subscriber 33b, and a telephone number "xxxxxxxx" is assigned to the private branch exchanger 33d.

Figure 7:
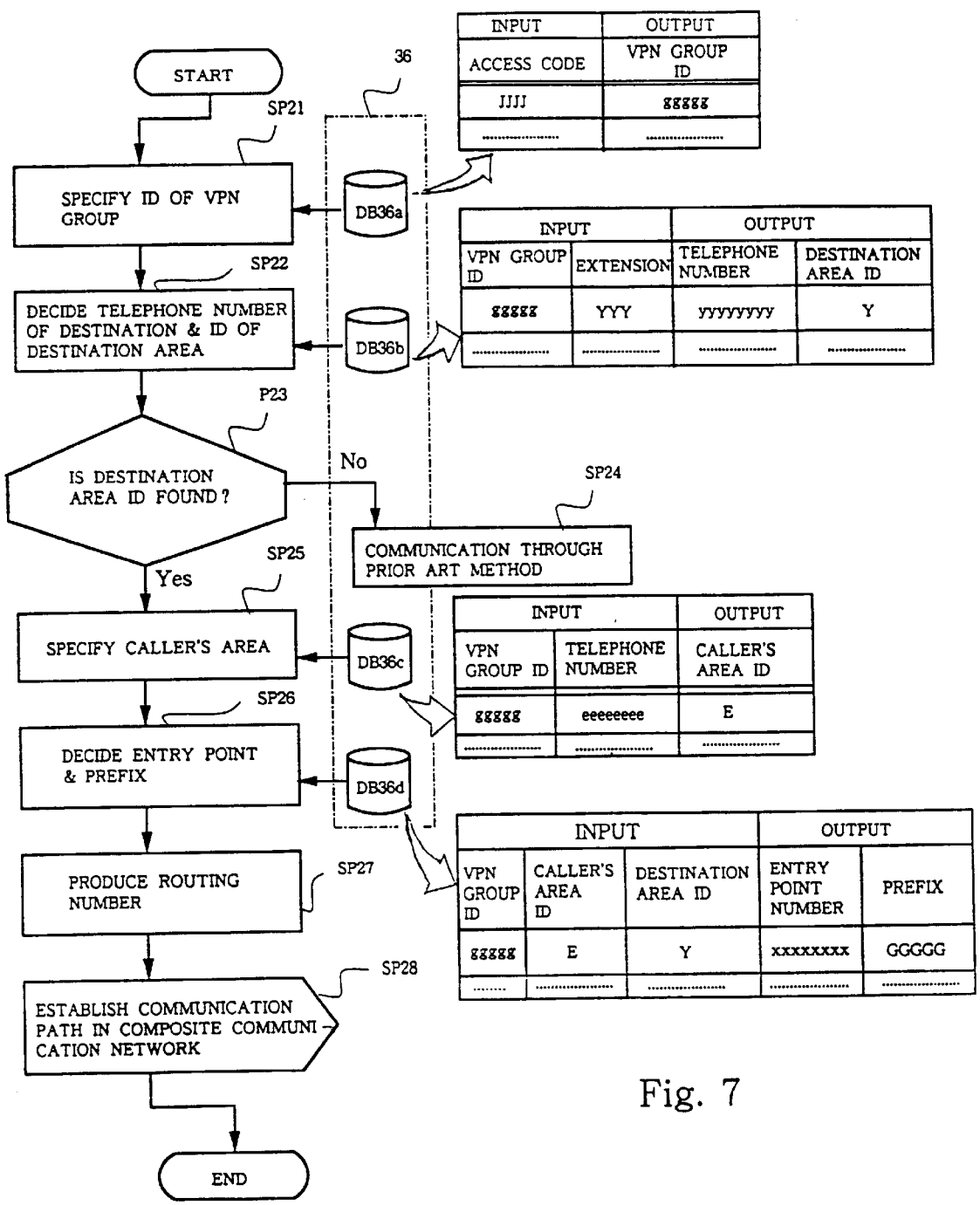
FIG. 7 is a flow chart showing the method according to the present invention.

FIG. 7 illustrates a control sequence for communicating through the composite communication network 31. The service control point 32d has a data base 36, and four tables DB36a/DB36b/DB36c/DB36d form parts of the data base 36. The first table DB36a defines relation between the access code and an identification number of virtual private network, and the second table DB36b defines relation between the combination of the identification number of virtual private network and an extension number and a combination of a telephone number of a destination and an identification number of the destination area. The third table defines relation between a combination of an identification number of the virtual private network and a caller's telephone number and an identification number of caller's area, and the fourth table defines relation between the identification number of virtual private network, the identification number of caller's area and the identification number of destination area and a combination of an entry point number and a prefix.

Assuming now that the subscriber 32e dials the access code "JJJJ" and the extension number "YYY", the access code "JJJJ" and the extension number "YYY" are transferred through the exchanger 32a to the service control point 32d, and the service control point starts the control sequence shown in FIG. 7.

The service control point 32d searches the first table DB36a for the access code, and specifies the identification number "ggggg" of the virtual private network 35 as by step SP21. The identification number "ggggg" is temporarily stored in an internal data storage (not shown) of the service control point 32d. The service control point 32d further searches the second table DB36b for the combination of the identification number "ggggg" and the extension number "YYY", and decides the telephone number of the subscriber 33b and the identification number of the destination area to be "yyyyyyyy" and "Y" as by step SP22. The telephone number "yyyyyyyy" and the identification number "Y" are stored in the internal data storage.

Subsequently, the service control point 32d checks to see whether or not an identification number of the destination is found at step SP22 as by step SP23. If the answer is given negative, the service control point 32d establishes a communication path between the subscribers through the prior art method as by step SP24.

When the identification number of the destination was found at step SP22, the answer at step SP23 is given affirmative, and the service control point 32d carries out the job called as "Off-Net Zone". The service control point 32d searches the third table DB36c for the combination of the identification number "ggggg" and the telephone number "eeeeeee", and decides the identification number of the caller's area to be "E" as by step SP25. The identification number "E" of caller's area is temporarily stored in the internal data storage.

Subsequently, the service control point searches the fourth table DB36d for the combination of the identification numbers "ggggg", "E" and "Y", and decides the entry point and the prefix to be "xxxxxxxx" and "GGGGG" as by step SP26. The entry point number is representative of the private branch exchanger closest to the subscriber 32e.

Subsequently, the service control point 32d combines the extension number "YYY" with the prefix "GGGGG", and produces a routing number "GGGGGYYY" as by step SP27. The service control point 32d supplies the routing number "GGGGGYYY" and the entry point number "xxxxxxxx" to the exchanger 32a, and the communication path 30 is established in the composite communication network 30 as by step SP28. In detail, the exchanger 32a connects the subscriber 32e through the exchanger 32b to the private branch exchanger 33d. The private branch exchanger 33d is connected through the leased line 34 to the private branch exchanger 33e, and the private branch exchanger 33e converts the extension number "YYY" to the telephone number "yyyyyyyy" assigned to the subscriber 33b, and the subscriber 32e is connected through the communication path 30 to the subscriber 33b.

As will be appreciated from the foregoing description, the service control point has the table for the private branch exchanger closest to the caller, and the communication path is established through the leased line between the subscribers. As a result, high-quality communication is established in the composite communication network through the leased line.

Although particular embodiments of the present invention have been shown and described, it will be apparent to those skilled in the art that various changes and modifications may be made without departing from the spirit and scope of the present invention.

What is claimed is:

1. A method for routing a communication path between a first subscriber and a second subscriber through a public network having service switching points and a service control point and a virtual private network having entry points and a leased line selectively coupled between said entry points, comprising the steps of:

a) transferring a first identification number and a second identification number respectively assigned to said first subscriber and said second subscriber through at least one of said service switching points to said service control point;

b) determining one of said entry points closest to said first subscriber and a routing number used in said virtual private network;

c) providing said routing number to said one of said entry points through said public network, for routing a communication sub-path passing through said leased line in said virtual private network; and d) establishing said communication path having said communication sub-path between said first subscriber and said second subscriber.

2. The method as set forth in claim 1, in which said first subscriber and said second subscriber are members of said virtual private network, and said second identification number is used for said virtual private network.

3. The method as set forth in claim 2, in which said step b) includes the sub-steps of b-1) determining a third identification number assigned to said virtual private network and a first area of said first subscriber on the basis of said first identification number, b-2) determining a fourth identification number assigned to said second subscriber for said public network and a second area of said second subscriber on the basis of a combination of said second identification number and said third identification number, b-3) determining said one of said entry points and a prefix on the basis of a combination of said first area, said second area and said third identification code, and b-4) producing said routing number from said prefix and said second identification number.

4. The method as set forth in claim 3, in which said step b) further includes the step of b-5) checking said third identification number to see whether or not said virtual private network has said leased line between said sub-step b-2) and said sub-step b-3), and the step b) proceeds to said step b-3) when an answer at said sub-step b-5) is given affirmative.

5. The method as set forth in claim 4, in which another communication path is established without said leased line when the answer at said sub-step b-5) is given negative.

6. The method as set forth in claim 1, in which said first subscriber is a member of said virtual private network, said second subscriber is out of said virtual private network, and said first identification number and said second identification number are respectively assigned to said first subscriber and said second subscriber for said public network.

7. The method as set forth in claim 6, in which said step b) includes the sub-steps of b-1) determining a third identification number assigned to said virtual private network and a first area of said first subscriber on the basis of said first identification number, b-2) determining a second area of said second subscriber on the basis of a combination of said second identification number and said third identification number, b-3) determining said one of said entry points and a prefix on the basis of a combination of said third identification number, said first area and said second area, and b-4) producing said routing number from said prefix and said second identification number.

8. The method as set forth in claim 7, in which said step b) further includes the step of b-5) checking said third identification number to see whether or not said virtual private network has said leased line between said sub-step b-1) and said sub-step b-2), and the step b) proceeds to said step b-2) when an answer at said sub-step b-5) is given affirmative.

9. The method as set forth in claim 8, in which another communication path is established without said leased line when the answer at said sub-step b-5) is given negative.

10. The method as set forth in claim 1, in which said first subscriber is out of said virtual private network, said second subscriber is a member of said virtual private network, and said second identification number is representative of an extension of said second subscriber in said virtual private network and an access code for entering into said virtual private network from the outside thereof.

11. The method as set forth in claim 10, in which said step b) includes the sub-steps of b-1) determining a third identification number assigned to said virtual private network on the basis of said access code, b-2) determining a fourth identification number assigned to said second subscriber for said public network and a first area of said second subscriber on the basis of a combination of said second identification number and said third identification number, b-3) determining a second area of said first subscriber on the basis of a combination of said first identification number and said third identification number, and b-4) determining said one of said entry points and a prefix on the basis of a combination of said third identification number, said first area and said second area.

12. The method as set forth in claim 11, in which said step b) further includes the step of b-5) checking said third identification number to see whether or not said-virtual private network has said leased line between said sub-step b-2) and said sub-step b-3), and the step b) proceeds to said step b-3) when an answer at said sub-step b-5) is given affirmative.

13. The method as set forth in claim 12, in which another communication path is established without said leased line when the answer at said sub-step b-5) is given negative.

* * * * *